United States Patent Office 2,885,401
Patented May 5, 1959

2,885,401

PROCESS FOR MAKING MORPHINAN DERIVATIVES AND PRODUCTS OBTAINABLE THEREBY

André Grüssner, Joseph Hellerbach, and Otto Schnider, Basel, Switzerland, assignors to Hoffmann-La Roche Inc., Nutley, N.J., a corporation of New Jersey No Drawing. Application March 18, 1957
Serial No. 646,548

Claims priority, application Switzerland March 22, 1956

4 Claims. (Cl. 260—285)

This invention relates to novel chemical processes and to certain novel chemical compounds which can be produced thereby. More particularly, the invention relates to novel processes for making substituted morphinans, and to certain novel end products which can be produced by those processes.

In one of its aspects, the invention relates to a general process of making compounds having the formula (I)

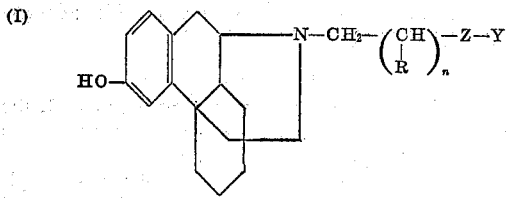

wherein R represents a member selected from the group consisting of hydrogen and lower alkyl, Z represents a divalent mononuclear homocyclic hydrocarbon radical, Y represents a member selected from the group consisting of hydrogen, hydroxy, lower alkyl, lower alkoxy and alkylenedioxy, and $n$ represents an integer selected from the series 1, 2, 3, 4, which comprises reacting 3-hydroxymorphinan with an acylating agent containing the acyl radical.

(II)

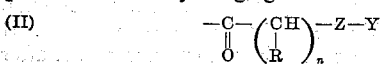

wherein R, Z, Y and $n$, respectively, have the same meaning previously indicated, thereby obtaining an acid amide having the formula (III)

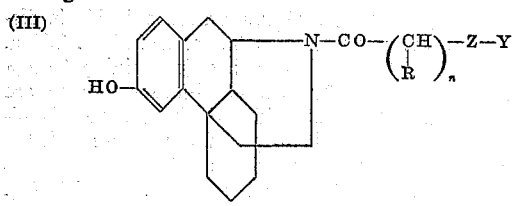

wherein R, Z, Y and $n$, respectively, have the same meaning previously indicated, and reducing the latter, thereby obtaining the compounds of Formula I above.

In a second aspect, the invention relates to compounds having the formula (IV)

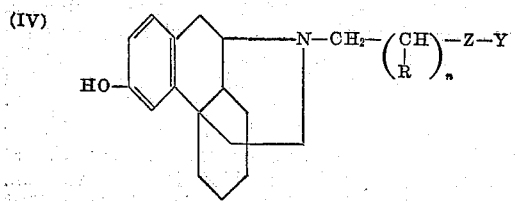

wherein R represents a member of the group consisting of hydrogen and lower alkyl, Z represents a divalent mononuclear homocyclic hydrocarbon radical, Y represents a member selected from the group consisting of nitro, amino, di(lower alkyl)amino, acylamino, hydroxy, lower alkyl, lower alkoxy and alkylenedioxy, and $n$ represents an integer selected from the series 1, 2, 3, 4, 5, and acid addition salts thereof with therapeutically acceptable acids.

In still another aspect, the invention relates to novel products having the formula (V)

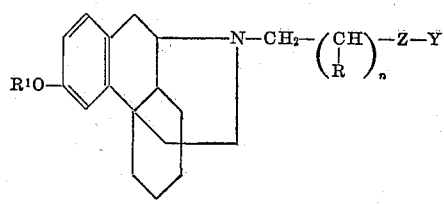

where R represents a member of the group consisting of hydrogen and lower alkyl, Z represents a divalent mononuclear homocyclic hydrocarbon radical, Y represents a member selected from the group consisting of hydrogen, nitro, amino, di(lower alkyl)amino, acylamino, hydroxy, lower alkyl, lower alkoxy and alkylene dioxy, $n$ represents an integer selected from the series 1, 2, 3, 4, 5, and $R^1$ represents a lower alkyl radical, and acid addition salts thereof with therapeutically acceptable acids.

In a fourth aspect, the invention relates to novel compounds having the formula (VI)

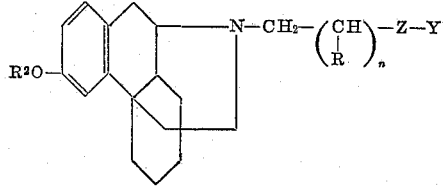

wherein R represents a member of the group consisting of hydrogen and lower alkyl, Z represents a divalent mononuclear homocyclic hydrocarbon radical, Y represents a member selected from the group consisting of hydrogen, nitro, amino, di(lower alkyl)amino, acylamino, hydroxy, lower alkyl, lower alkoxy and alkylenedioxy, and $n$ represents an integer selected from the series 1, 2, 3, 4, 5, and $R^2$ represents a lower alkanoyl radical, and acid addition salts thereof with therapeutically acceptable acids.

In a fifth aspect, the invention relates to novel compounds having the formula (VII)

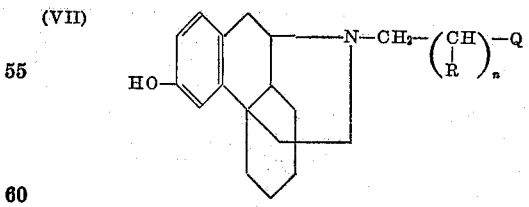

wherein R represents a member of the group consisting of hydrogen and lower alkyl, Q represents a monovalent mononuclear hydroaromatic radical, and $n$ represents an integer selected from the series 1, 2, 3, 4, 5, and acid addition salts thereof with therapeutically acceptable acids.

As starting materials, racemic, as well as optically-active, 3-hydroxy-morphinan, can be used, both of which may be prepared according to Belgian Patent No. 533,046.

In the first stage of the process according to the invention, 3-hydroxy-morphinan is converted to the corresponding acid amide, by treatment with an acylating agent containing the acyl radical of Formula II, preferably an acid halide or an ester. The acylating agents which are used here contain a divalent mononuclear homocyclic hydrocarbon radical which can be substituted by hydroxy, lower alkyl, lower alkoxy or alkylenedioxy radicals. Examples of such acylating agents are homoveratric acid chloride, p-methoxy-phenyl-acetic acid methyl ester and cyclohexen-(1)-ylacetyl chloride. The reaction of 3-hydroxy-morphinan with an ester is suitably effected by heating the two reaction components together. The reaction of 3-hydroxy-morphinan with an acid halide, for example an acid chloride, preferably takes place in the presence of a solvent, e.g., dimethylformamide, and in the presence of an acid-binding agent, e.g., alkali metal carbonate. The acid amides obtained are crystalline or resinous compounds of neutral character. They are soluble in ether and tetrahydrofuran, easily soluble in alcohols, but difficultly soluble in water.

The acid amides are converted, in the second stage of the process, to the corresponding N-aralkyl or N-(cycloalkyl-alkyl)-morphinan, by treating with reducing agents. The reduction preferably is effected by means of alkali metal aluminum hydrides, e.g. lithium aluminum hydride, in the presence of a solvent, e.g. ether, tetrahydrofuran and dioxan. The N-substituted-3-hydroxy-morphinans so obtained can be converted to the corresponding N-substituted 3-lower alkoxy-morphinans by treating with a lower alkylating agent, e.g. phenyl-trimethyl-ammonium hydroxide. By treatment with an acylating agent, e.g. a lower alkanoic acid halide, such as acetylchloride, or a lower alkanoic acid anhydride, such as acetic anhydride, the corresponding N-substituted-3-lower acyloxy-morphinans are formed.

The N-substituted 3-hydroxy-morphinans, and their 3-ethers and 3-esters, are basic substances which are soluble in the usual organic solvents, e.g. in alcohol, ether and acetone. In water, however, they are only difficultly soluble. By reaction with therapeutically acceptable inorganic acids, e.g. sulfuric acid, phosphoric acid, hydrochloric acid and hydrobromic acid, and with therapeutically acceptable organic acids, e.g. malic acid, citric acid, or tartaric acid, the corresponding acid addition salts can be obtained. These salts dissolve in water and lower alkanols but are only difficultly soluble in ethers.

The free bases and their acid salts, exhibit activity on the central nervous system: They are useful as antitussives. The levo-rotatory compounds are also useful as analgesics.

Example 1

243 g. of (—)-3-hydroxy-morphinan is dissolved in 1700 cc. of dimethyl-formamide by heating to 100° C. 138 g. of dry, powdered potassium carbonate is added, and 215 g. of homoveratric acid chloride is dropped in within 30 minutes. The reaction is completed by heating at 100–120° C. for 2 hours. The reaction mixture is cooled, the inorganic salts are removed by suction filtration and the solvent is distilled off from the filtrate. The residue is taken up in a mixture of equal parts of benzene and butanol. The solution is washed successively with 5% hydrochloric acid, 5% sodium bicarbonate and water. The solvent mixture is then distilled off.

421 g. of the resinous acid amide so obtained is dissolved in 1000 cc. of dioxan, while stirring, and the solution is dropped into a solution of 40 g. of lithium aluminum hydride in 100 cc. of dioxan and 1500 cc. of ether, at such a rate that the ether barely boils. Finally, the reaction mixture is heated under reflux with stirring for 2 hours.

To the cooled solution 80 cc. water is added, the solution is concentrated by removal of ether and dioxan, evaporated, the residue is extracted several times with a mixture of equal parts of benzene and butanol, and the solvent is distilled off from the extract. 400 g. of (—)-3-hydroxy-N-(3,4-dimethoxy-phenylethyl)-morphinan are thus obtained. After recrystallization from dilute ethanol, the compound melts at 192–194° C. The corresponding hydrochloride is obtained by dissolving the base in alcohol and adding alcoholic hydrochloric acid. M.P. 238–240° C.; $[\alpha]_D^{20} = -68.1°$ (c.=1 in methanol).

Example 2

243 g. of (—)-3-hydroxy-morphinan is heated with 180 g. of p-methoxy-phenyl acetic acid methyl ester for two hours at 200° C. The acid amide so obtained is cooled and dissolved in 2000 cc. of tetrahydrofuran and dropped into a solution of 40 g. of lithium aluminum hydride in 800 cc. of tetrahydrofuran while stirring. After boiling for two hours, the reaction mixture is cooled, and (—)-3-hydroxy-N-(p-methoxy-phenyl-ethyl)-morphinan is isolated by a similar procedure to that of Example 1. M.P. 154–156° C. The tartrate obtained therefrom melts, after recrystallization from methanol-ether, at 145–146° C.; $[\alpha]_D^{20} = -47.9°$ (c.=1 in methanol).

By boiling the above base with 48% hydrobromic acid for two hours, concentrating, neutralizing to precipitate the basic hydrolysis product, dissolving in alcohol, acidifying with alcoholic hydrochloric acid and adding ether until turbidity occurs, (—)-3-hydroxy-N-(p-hydroxy-phenyl-ethyl)-morphinan-hydrochloride, of melting point 187–190° C., is obtained.

Example 3

By proceeding in the manner taught by Example 1, the acid amide is formed from (—)-3-hydroxy-morphinan and cyclohexen-(1)-ylacetyl chloride.

365 g. of (—)-3 - hydroxy - N - (cyclohexen - (1)-yl-acetyl)-morphinan is dissolved in 3000 cc. of ether and dropped into a solution of 400 g. of lithium aluminum hydride in 800 cc. of ether, at such a rate that the ether solution just boils. After boiling for three hours, the reaction mixture is cooled, 80 cc. of water are added, and 3 N hydrochloric acid is added, to a weak Congo red end point. Upon standing, the hydrochloride of (—)-3-hydroxy-N-(cyclohexen-(1)-yl-ethyl) - morphinan crystallizes out. After recrystallization from methanol-ether, it melts at 263–265° C.; $[\alpha]_D^{20} = -59.2°$ (c.=1 in methanol). The base obtained therefrom melts, after recrystallization from benzene, at 209–211° C.

Example 4

259 g. of trimethyl-phenyl-ammonium chloride is dissolved in 350 cc. of absolute methanol at 25° C. 266 g. of methanolic potassium hydroxide (containing 31.5% by weight KOH) and 300 cc. of absolute toluene are added. The potassium chloride which separates is filtered off and washed with 50 cc. of pure methanol, the washings being added to the filtrate. This methylation mixture is added, while stirring, to a solution of 347 g. of (—)-3-hydroxy - N - phenyl - ethyl-morphinan (melting point 243–245° C., from dimethyl-formamide) in 5600 cc. of absolute toluene and 2800 cc. of methanol, produced in the manner taught by Example 1.

The reaction mixture is warmed slowly so that first methanol, and then a mixture of methanol and toluene, is distilled off. The reaction is finished as soon as the temperature reaches 100–110° C., when only toluene distills off. After cooling, the reaction solution is washed with water, dilute aqueous sodium hydroxide and again with water. After evaporation in vacuum, the residue is freed of dimethylaniline (boiling point 70–90° C.) at 11 mm. Hg, and further distilled in high vacuum. (—)-3-methoxy-N-phenyl-ethyl-morphinan boils at 179° C./0.006 mm.

The tartrate obtained by reaction with tartaric acid crystallizes from isopropanol-water with 2 mols of water of crystallization and melts at 104–105° C.;

$[\alpha]_D^{20} = -37.4°$ (c.=1.42 in methanol).

Example 5

347 g. of (—)-3-hydroxy-N-phenyl-ethyl-morphinan is heated in 1750 cc. of acetic anhydride at 80° C. for 4 hours. The reaction solution is freed in vacuum of excess acetic anhydride. The residue is dissolved in benzene, the solution is washed with ice cold 1 N soda solution and ice water. The benzene solution, dried with sodium sulfate, is evaporated in vacuum and the (—)-3-acetoxy-N-phenyl-ethyl-morphinan is distilled in high vacuum, boiling point 174° C./0.001 mm. The hydrochloride crystallizes with ½ mol of water of crystallization from alcohol-ether and melts at 186–187° C. $[\alpha]_D^{19} = -55.2°$ (c.=1.1236 in methanol).

Example 6

243 g. of (—)-3-hydroxy-morphinan is dissolved in 1000 cc. of dimethylformamide by heating to 120° C. while stirring; 138 g. of dry powdered potassium carbonate is added and 304 g. of N-carbo-benzoxy-p-aminophenyl-acetic acid chloride is slowly added. The reaction is completed by heating the mixture to 100–120° C. After cooling, the inorganic salts are filtered by suction and the dimethyl-formamide is distilled off in vacuum. The residue is dissolved in a mixture of equal parts of benzene and butanol and the solution is successively washed with 5% sodium bicarbonate, water, 5% hydrochloric acid, and water again. The solvent is distilled off.

510 g. of the light yellow resinous acid amide is shaken for 12 hours at room temperature with 1000 cc. of a 20% hydrobromic acid solution in glacial acetic acid. After distilling off the hydrobromic acid-glacial acetic acid solution in vacuum, water is added to the residue, and the mixture is extracted with ether. By distilling off the ether, 180 grams of the basic amide is obtained. This is dissolved in 2000 cc. of dry tetrahydrofuran. 40 g. of lithium aluminum hydride are added portionwise to this solution, while stirring, so that vigorous reaction takes place. Finally, the mixture is heated under reflux for 2 hours. To destroy the excess of lithium aluminum hydride, water is added dropwise, and the tetrahydrofuran solution is then evaporated to dryness in vacuum. The free base is obtained by dissolving the residue in dilute hydrochloric acid, neutralizing the acidic solution with ammonia, and dissolving the separated base in ether. After drying and distilling off the ether, and moistening the residue with acetone, (—)-3-hydroxy-N-(p-aminophenyl-ethyl)-morphinan crystallizes. After recrystallization from acetone, the base melts at 197–199° C.; $[\alpha]_D^{20} = -103.6°$ (c.=1 in methanol).

The following compounds are obtained by using the methods of the foregoing examples:

(—)-3-hydroxy-N-(ω - phenylbutyl) - morphinan-tartrate, M.P. 179–180° C.; $[\alpha]_D^{20} = -33°$ (c.=1 in methanol); base: M.P. 144–146° C.

(—)-3-hydroxy - N - (β - phenylbutyl) - morphinan-tartrate, M.P. 140–143° C.; $[\alpha]_D^{20} = -40.9°$ (c.=0.948 in methanol).

(—)-3-hydroxy - N - (3,4,5-trimethoxy-phenylethyl)-morphinan-hydrochloride, M.P. 240–242° C.;

$[\alpha]_D^{20} = -61.5°$ (c.=0.858 in methanol); base: M. P. 181–183° C.

Racemic 3 - hydroxy - N - phenylethyl - morphinan-hydrobromide, M.P. 260–262° C.; base: M.P. 218–220° C.

(—)-3 - hydroxy - N - (m - methoxy - phenylethyl)-morphinan-hydrochloride, M.P. 168–170° C.;

$[\alpha]_D^{20} = -69.1°$ (c.=1 in methanol); base: M.P. 189–190° C.

(—)-3-hydroxy - N - (cyclohexylethyl) - morphinan-hydrochloride, M.P. 235–236° C.; $[\alpha]_D^{20} = -57.3°$ (c.=1 in methanol); base: M.P. 195–196° C.

(—)-3-hydroxy-N-(p-methyl-phenylethyl)-morphinan-hydrochloride, M.P. 284–290° C. with decomposition; $[\alpha]_D^{20} = -75.4°$ (c.=1 in methanol); base: M. P. 173–174° C.

(—)-3-hydroxy-N-(3,4 - methylenedioxy-phenylethyl)-morphinanhydrochloride, M.P. 290–292° C.;

$[\alpha]_D^{19} = -53.75°$ (c.=1.0428 in methanol); base: M.P. 176–178° C.

(—)-3-hydroxy-N-(2-methyl-4-methoxy - phenylethyl)-morphinanhydrochloride, M.P. 249–251° C.;

$[\alpha]_D^{19} = -66.22°$ (c.=1.042 in methanol).

(—)-3-hydroxy-N-(ω-phenylpropyl)-morphinan-hydrobromide, M.P. 132° C.; $[\alpha]_D^{20} = -43°$ (c.=1.139 in methanol); base: M.P. 140–142° C.

(+)-3-hydroxy-N-phenylethyl - morphinan - hydrobromide, M.P. 284–285° C.; $[\alpha]_D^{20} = +63.16°$ (c.=1 in ethanol).

(+)-3-methoxy - N - phenylethyl - morphinan-tartrate, M.P. 119–122° C.; $[\alpha]_D^{20} = +62.66°$ (c.=3 in ethanol).

Further compounds which are within the scope of the invention are:

(—)-3-hydroxy - N - (p - dimethylamino-phenylethyl)-morphinan, M.P. 135–137° C.; $[\alpha]_D^{14} = -89.4°$ (c.=1 in methanol).

(—)-3-hydroxy - N - (p - nitrophenylethyl)-morphinan-hydrochloride, M.P. 239–241° C.; $[\alpha]_D^{13} = -84.6°$ (c.=1 in methanol).

We claim:
1. 3-hydroxy-N-(p-amino-phenylethyl)-morphinan.
2. 3-hydroxy-N-p-nitro-phenylethyl-morphinan.
3. 3 - hydroxy - N - (3,4-methylenedioxy-phenylethyl)-morphinan.
4. A process for the preparation of a compound having the formula

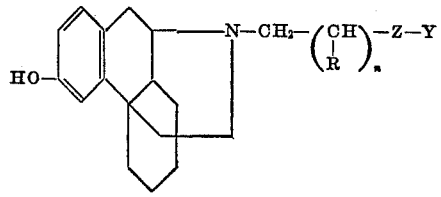

wherein R represents a member of the group consisting of hydrogen and lower alkyl, Z represents a divalent mononuclear homocyclic hydrocarbon radical containing six carbon atoms in the cycle, Y represents a member selected from the group consisting of hydrogen, hydroxy, lower alkyl, lower alkoxy and alkylenedioxy, and n represents an integer selected from the series 1, 2, 3, 4, which comprises reacting 3-hydroxymorphinan with an acylating agent selected from the group consisting of those having the formulas $$\text{halogen-}\underset{\underset{O}{\|}}{C}-\left(\underset{R}{\overset{|}{C}H}\right)_n-Z-Y$$

and $$\text{lower alkyl-}O-\underset{\underset{O}{\|}}{C}-\left(\underset{R}{\overset{|}{C}H}\right)_n-Z-Y$$

wherein R, Z, Y and n have the same meaning previously indicated, thereby obtainng an acid amide having the formula

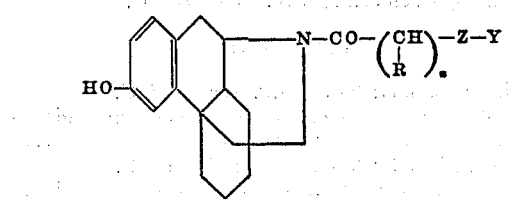

wherein R, Z, Y and n have the same meaning previously indicated; and reducing the carbonyl group of said acid amide by treatment with an alkali metal aluminum hydride.

References Cited in the file of this patent
UNITED STATES PATENTS 2,524,856  Schnider et al. _____ Oct. 10, 1950

OTHER REFERENCES

World Health Organization Technical Report Series No. 102, Sixth Report. Pp. 8 and 9, March 1956. Report originally issued in mimeographed form as document WHO/APD/68, October 29, 1955.

UNITED STATES PATENT OFFICE
CERTIFICATE OF CORRECTION

May 5, 1959

Patent No. 2,885,401

André Grüssner et al.

It is hereby certified that error appears in the printed specification of the above numbered patent requiring correction and that the said Letters Patent should read as corrected below.

Column 1, line 39, after "radical" strike out the period; column 4, line 40, for "400 g." read -- 40 g. --; column 6, lines 15 and 21, for "morphinanhydrochloride," read -- morphinan-hydrochloride, --.

Signed and sealed this 25th day of August 1959.

(SEAL)

Attest:

KARL H. AXLINE
Attesting Officer

ROBERT C. WATSON
Commissioner of Patents